United States Patent [19]

Moriyama

[11] Patent Number: 4,840,469
[45] Date of Patent: Jun. 20, 1989

[54] TELEPHOTO ZOOM LENS

[75] Inventor: Keiji Moriyama, Yokohama, Japan

[73] Assignee: Nikon Corporation, Tokyo, Japan

[21] Appl. No.: 114,581

[22] Filed: Oct. 30, 1987

[30] Foreign Application Priority Data

Nov. 6, 1986 [JP] Japan .................................. 61-264315
Nov. 6, 1986 [JP] Japan .................................. 61-264316

[51] Int. Cl.$^4$ .......................... G02B 15/16; G02B 9/64
[52] U.S. Cl. ....................................... 350/427; 350/450
[58] Field of Search ........................ 350/427, 423, 450

[56] References Cited

U.S. PATENT DOCUMENTS 4,729,643  3/1988  Kawaguchi et al. ............... 350/427

Primary Examiner—Bruce Y. Arnold
Assistant Examiner—Rebecca D. Gass
Attorney, Agent, or Firm—Shapiro and Shapiro

[57] ABSTRACT

A telephoto zoom lens comprising, in succession from the object side, a first lens group having a positive refractive power, a second lens group having a negative refractive power, and a third lens group having a positive refractive power, the lens groups being moved independently of each other during zooming. The telephoto zoom lens meets certain conditions, including a condition that prescribes the amount of change in spacing between the first and second lens groups by zooming, so that the spacing increases at the telephoto end. The telephoto ratio is large, and the lens is relatively compact at the wide angle end. The burden borne by each lens group regarding correction of spherical aberration is reduced, and correction of spherical aberration is relatively easy, so that the degree of freedom in lens design is enhanced.

13 Claims, 3 Drawing Sheets

TELEPHOTO ZOOM LENS

BACKGROUND OF THE INVENTION

1. Field of the Invention

The present invention relates to a compact zoom lens, and in particular to improvements in a compact telephoto zoom lens which comprises, in succession from the object side, three positive, negative and positive groups.

2. Related Background Art

A telephoto zoom lens comprising, in succession from the object side, three groups having positive, negative and positive refractive powers is a developed form of the well-known telephoto zoom lens comprising four positive, negative, positive and positive groups. In a telephoto lens of the three-group construction of this type, the positive third group in the conventional four-group construction for keeping the position of the image surface constant and the positive fourth group which is an imaging group are made integral with each other to constitute a positive third lens group and further, the third lens group including the imaging group is moved along the optic axis with the other lens groups during zooming, whereby a magnification changing operation may be accomplished. Accordingly, the magnification changing operation is borne in common by the second lens group and the third lens group and therefore, the amount of magnification change by the negative second lens group which served as the conventional magnification changing group, that is, the variation in magnification caused by the positional relation between the image point of the first lens group and the second lens group during zooming, could be made smaller in this zoom lens of three-group construction than in the conventional telephoto zoom lens of four-group construction.

In the conventional zoom lens of three-group construction of this type, however, if the refractive power of the first lens group is strengthened to make the magnification changing system more compact, the imaging magnification of the second lens group will become great and the image point of the second lens group, namely, the object point of the third lens group, will move greatly toward the object side. Therefore, it becomes difficult to sufficiently secure the spacing between the second lens group and the third lens group with the focal length of the zoom lens being maximum at the telephoto end. Accordingly, to solve this, it becomes necessary that the third lens group be made into a telephoto type in which the telephoto ratio (the ratio of the full length to the focal length) is extremely small. However, making the third lens group which is the imaging group into a telephoto type in which the telephoto ratio is extremely small has led to the disadvantage that it becomes difficult to correct spherical aberration, particularly the spherical aberration at the telephoto side on which the focal length is long.

Further, if the refractive power of the second lens group having a negative refractive power is strengthened to provide a compact construction, the positive refractive power component in the second lens group will be relatively weakened and it will become difficult to secure the degree of freedom of the aberration correction of the lens group. Therefore, it will become difficult to correct the fluctuation of various aberrations caused by zooming. If in order to overcome this, an attempt is made to make the curvature of the joined surface of the negative lens and the positive lens in the second lens group sharper and strengthen the positive refractive power component, it has led to the disadvantage that fluctuation of chromatic spherical aberration is caused by zooming.

SUMMARY OF THE INVENTION

It is an object of the present invention to overcome the above-noted disadvantages peculiar to the conventional telephoto zoom lens of three-group construction and to provide a very compact telephoto zoom lens having a good imaging performance over the entire range of magnification change.

The present invention is a telephoto zoom lens which comprises, in succession from the object side, a first lens group having a positive refractive power, a second lens group having a negative refractive power and a third lens group having a positive refractive power, said lens groups being moved independently of each other for a magnification change and focusing, and satisfying the following conditions:

$$1.3 < f_1/f_W < 1.6 \tag{1}$$
$$0.25 < |f_2/f_W| < 0.45 \tag{2}$$
$$0.44 < f_3/f_W < 0.52 \tag{3}$$

$$\left| \frac{1}{\beta_{2W}} - \frac{1}{\beta_{2T}} \right| < 1.55 \tag{4}$$

$$\beta_{2W}/\beta_{2T} < 0.6 \tag{5}$$

$$0.1 < \left| \frac{1}{\beta_{3W}} - \frac{1}{\beta_{3T}} \right| < 0.3 \tag{6}$$

$$0.55 < \beta_{3W}/\beta_{3T} < 0.75 \tag{7}$$

where $f_W$: the focal length of the entire system at the wide end (the shortest focal length of the entire system)
$f_1$: the focal length of the first lens group
$f_2$: the focal length of the second lens group
$f_3$: the focal length of the third lens group
$\beta_{2W}$: the imaging magnification at the wide end (the shortest focal length state of the entire system) of the second lens group
$\beta_{2T}$: the imaging magnification at the telephoto end (the longest focal length state of the entire system) of the second lens group
$\beta_{3W}$: the imaging magnification at the wide end of the third lens group
$\beta_{3T}$: the imaging magnification at the telephoto end of the third lens group.

In the present invention, the first lens group is of relatively weak refractive power. Thus, the object point of the third lens group can be moved toward the image side and the imaging magnification of the second lens group can be made small. If the imaging magnification of the second lens group becomes small, the load of the second lens group for aberration correction can be mitigated and the refractive power of the second lens group can be more strengthened. Thereby, the magnification changing system can be constructed compactly in spite of the refractive power of the first lens group having been weakened, and the object point of the third lens group can be moved more toward the image side. In such case, if the refractive power of the second lens group is strengthened, the imaging magnification of the third lens group becomes great, thus resulting in bulkiness of the imaging system. However, the object point of the third lens group moves greatly toward the image side and it becomes unnecessary to make the third lens group into a telephoto type in which the telephoto ratio is extremely great and therefore, the load of the third lens group for aberration correction is mitigated and the refractive power of the third lens group can be strengthened. Accordingly, the imaging system can be constructed compactly. In this manner, success has been attained in making the lens system compact without making the third lens group into a telephoto type in which the telephoto ratio is extremely great.

Expressions (1), (2) and (3) prescribe appropriate ranges of refractive power of the respective lens groups. If the upper limit of expression (1) is exceeded, the refractive power of the first lens group will become too weak and it will become difficult to construct the magnification changing system compactly. If the lower limit of expression (1) is exceeded, the imaging magnification of the second lens group will become great and further, the object point of the third lens group will move toward the object side and it will become necessary to make the third lens group into a telephoto type in which the telephoto ratio is extremely great, and aberration correction will become difficult. If the upper limit of expression (2) is exceeded, it will become difficult to make the magnification changing system compact and further, the object point of the third lens group will move toward the object side with a result that it will become necessary to make the third lens group into a telephoto type in which the telephoto ratio is extremely great, and this is not preferable. If the lower limit of expression (2) is exceeded, Petzval sum will become excessively negative and not only it will become difficult to correct astigmatism and curvature of image field, but also the imaging magnification of the third lens group will become excessively great, thus resulting in bulkiness of the imaging system. If the upper limit of expression (3) is exceeded, the imaging system will become bulky, and if the lower limit of expression (3) is exceeded, the refractive power of the third lens group will become excessively strong and correction of spherical aberration will become difficult.

The inverse number of the imaging magnification of the second lens group is indicative of the distance between the image point of the first lens group and the second lens group. Accordingly, expressions (4) and (5) prescribe the amount of magnification change borne by the second lens group due to the difference and ratio by zooming in the distance between the image point of the first lens group and the second lens group. If the upper limits of expressions (4) and (5) are exceeded, the amount of magnification change borne by the second lens group will become great and therefore, the fluctuation of aberrations by zooming caused by the magnification changing action of the second lens group will also become greater and the aberration correction by the second lens group will become difficult. To solve this, the structure of the second lens group must be made more complex and therefore, it will become impossible to strengthen the refractive power of the second lens group and it will become difficult to make the lens system compact.

The inverse number of the imaging magnification of the third lens group is indicative of the distance between the image point of the second lens group and the third lens group. Accordingly, expressions (6) and (7) prescribe the amount of magnification change borne by the third lens group due to the difference and ratio by zooming in the distance between the image point of the second lens group and the third lens group. If the upper limits of expressions (6) and (7) are exceeded, the amount of magnification change borne by the third lens group will become excessively great, and this is not preferable in aberration correction. If the lower limits of expressions (6) and (7) are exceeded, the amount of magnification change borne by the third lens group will become excessively small and therefore, the amount of magnification change borne by the second lens group must be made excessively great, and this is not preferable.

As described above, according to the present invention, an appropriate refractive power of each lens group and the imaging magnification during zooming are provided as shown in the above-mentioned conditions (1)–(7), whereby there can be achieved a compact zoom lens having an excellent imaging performance over the entire range of magnification change.

To balance the amount of magnification change borne by the second lens group with the amount of magnification change borne by the third lens group, it is desirable to provide the lower limits of conditions (4) and (5) as follows:

$$1.3 < \left| \frac{1}{\beta_{2W}} - \frac{1}{\beta_{2T}} \right| < 1.55 \qquad (4')$$

$$0.5 < \beta_{2W}/\beta_{2T} < 0.6 \qquad (5')$$

Also, in the present invention as described above, it is further desirable to make the third lens group into a construction as shown below. The third lens group is divided, in succession from the object side, a forward positive lens group and a rearward negative lens group. Further, the forward positive lens group comprises, in succession from the object side, three positive lens components, i.e., a positive single lens, a cemented lens consisting of a positive lens and a negative lens having its surface of sharper curvature facing the object side cemented together and having a positive refractive power, and a positive meniscus lens having its convex surface facing the object side, and it is desirable to satisfy the following conditions:

$$0.6 < f_{3F}/f_3 < 1.3 \qquad (8)$$

$$1.5 < |f_{3R}/f_3| < 8.5 \qquad (9)$$

$$0.35 < f_{3F}/f_{31} < 0.65 \qquad (10)$$

where
$f_{3F}$: the focal length of the forward positive lens group in the third lens group
$f_{3R}$: the focal length of the rearward negative lens group in the third lens group
$f_{31}$: the focal length of the first lens in the forward positive lens group in the third lens group.

Expressions (8), (9) and (10) prescribe the structure of the third lens group.

If the upper limit of expression (8) is exceeded, it will become difficult to make the third lens group compact. If the lower limit of expression (8) is exceeded, the relative aperture of the third lens group will become great and correction of spherical aberration will become difficult.

If the upper limit of expression (9) is exceeded, the full length of the third lens group will become great and it will become difficult to make the third lens group compact. If the lower limit of expression (9) is exceeded, Petzval sum will become excessively negative and correction of astigmatism and curvature of image field will become difficult.

If the upper limit of expression (10) is exceeded, extroversive coma will occur and further, spherical aberration, particularly the spherical aberration of the wide side, will become negative and the fluctuation of spherical aberration by zooming will become excessively great, and this is not preferable.

Also, where in the three-group telephoto zoom lens of the present invention which satisfies the above-mentioned conditions (1), (2) and (3), the second lens group is constructed of three lenses, in succession from the object side, namely, a negative first lens having its surface of sharper curvature facing the image side, a positive meniscus second lens joined thereto and having its convex surface facing the object side, and a negative third lens, it is desirable to satisfy the following conditions:

$$1.84 < n_{22} < 1.91 \tag{11}$$
$$-0.82 < r_{22}/f_2 < -0.72 \tag{12}$$
$$0.8 < \frac{r_{25} + r_{24}}{r_{25} - r_{24}} < 1.3 \tag{13}$$

where
$n_{22}$: the refractive index of the second lens in the second lens group
$f_2$: the focal length of the second lens group
$r_{22}$: the radius of curvature of the joined surface of the first lens and the second lens in the second lens group
$r_{24}$: the radius of curvature of that surface of the third lens in the second lens group which is adjacent to the object side
$r_{25}$: the radius of curvature of that surface of the third lens in the second lens group which is adjacent to the image side.

In this case, it becomes possible to make great the difference in refractive index between the negative first lens and the positive meniscus second lens constituting the cemented negative lens in the second lens group, thereby strengthening the positive refractive power and securing the degree of freedom of aberration correction of the lens group. More specifically, it becomes possible to make the refractive index of the positive second lens higher and strengthen the positive refractive power component in the second lens group and at the same time, weaken the curvature of the joined surface of the first lens and the second lens. Accordingly, it is possible to strengthen the positive refractive power component in the second lens group and secure the degree of freedom of aberration correction of the second lens group while suppressing the fluctuation of chromatic spherical aberration caused by zooming, and it becomes easy to correct various aberrations well while constructing the magnification changing system compactly.

The above-mentioned expression (11) prescribes an appropriate range of refractive index of the second lens in the second lens group. If the upper limit of expression (11) is exceeded, the range of refractive index of the ordinary glass material will be exceeded, and this is not preferable. Also, if the positive refractive power component in the second lens group is weakened, the degree of freedom of aberration correction of the second lens group will decrease and therefore, it is not easy to strengthen the refractive power of the second lens group and thereby construct the magnification changing system compactly, and for this reason, it is desirable that the lower limit of expression (11) be not exceeded.

Expression (12) prescribes the appropriate curvature of the joined surface of the first lens and the second lens in the second lens group, and to suppress the fluctuation of chromatic spherical aberration caused by zooming, it is desirable that the upper limit of expression (12) be not exceeded. If the lower limit of expression (12) is exceeded, achromatism will become difficult within the range of the existing glass material.

Expression (13) prescribes the shape of the third lens in the second lens group. If the upper limit of expression (13) is exceeded, astigmatism will become excessively positive and introversive coma will occur, and this is not preferable. If the lower limit of expression (13) is exceeded, astigmatism will become excessively negative and extroversive coma will occur, and this is not preferable.

Further objects, features and effects of the present invention will become fully apparent from the following detailed description taken in conjunction with the accompanying drawings.

DESCRIPTION OF THE PREFERRED EMBODIMENTS

Figure 1:
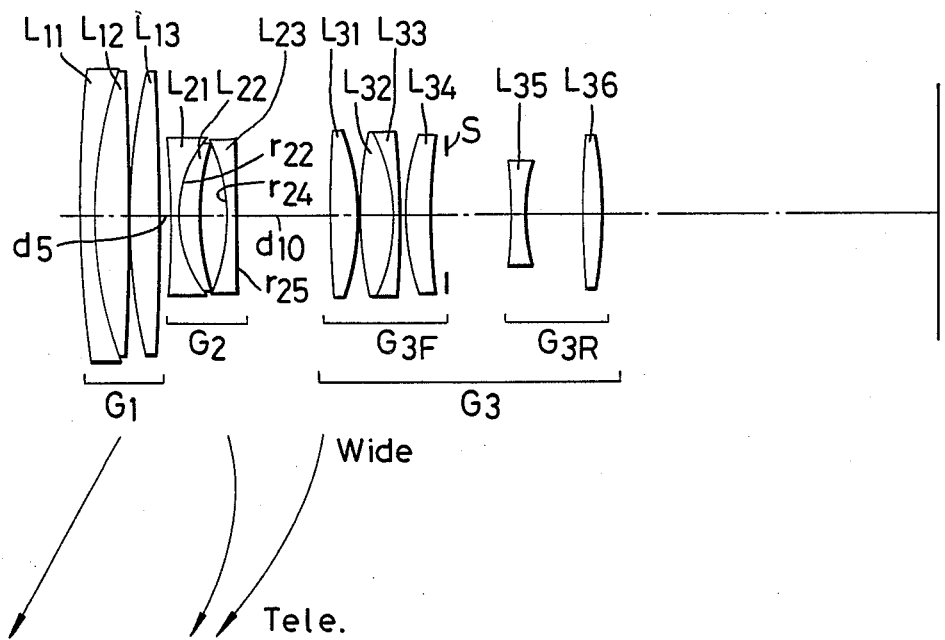
FIG. 1 shows a lens construction according to a first embodiment of the present invention.

In a first embodiment of the present invention which is shown in FIG. 1, a first lens group G1 having a positive refractive power comprises, in succession from the object side, a negative meniscus lens L11 having its convex surface facing the object side, a biconvex positive lens L12 joined thereto and a biconvex positive lens L13, a second lens group G2 having a negative refractive power comprises, in succession from the object side, a negative first lens L21 having its surface of sharper curvature facing the image side, a positive meniscus second lens L22 joined thereto and having its convex surface facing the object side, and a negative third lens L23 having its surface of sharper curvature facing the object side, a forward group G3F in a third lens group G3 having a positive refractive power comprises a positive lens L31 having its surface of sharper curvature facing the image side, a biconvex positive lens L32, a negative meniscus lens L33 joined thereto and having its convex surface facing the image side, and a positive meniscus lens L34 having its convex surface facing the object side, and a rearward group G3R in the third lens group G3 comprises a negative lens L35 having its surface of sharper curvature facing the image side, and a biconvex positive lens L36.

In the first embodiment, as shown in FIG. 1, a stop S is disposed between the forward group G3F and the rearward group G3R in the third lens group G3.

Also shown in FIG. 1 is the movement locus of each lens group when zooming is effected from the wide angle side to the telephoto side. The first lens group G1 is linearly moved toward the object side, the second lens group G2 is moved toward the image side while depicting a convex non-linear locus, and the third lens group G3 is non-linearly moved toward the object side.

The numerical data of the first embodiment of the present invention will be shown below. In the table below, the numbers at the left end represent the order from the object side, f represents the focal length of the entire system, and Bf represents the back focal length.

$$\frac{r_{25} + r_{24}}{r_{25} - r_{24}} = 0.9867$$

$n_{22}$ slightly deviates from the lower limit of condition (11), and $r_{22}/f_2$ slightly deviates from the upper limit of condition (12). When extremely precise depiction is required as when a photograph is greatly enlarged and used, it is desirable to set the values of $n_{22}$ and $r_{22}$ within the ranges of conditions (11) and (12) in order to suppress the fluctuation of chromatic spherical aberration during zooming.

Figure 2:
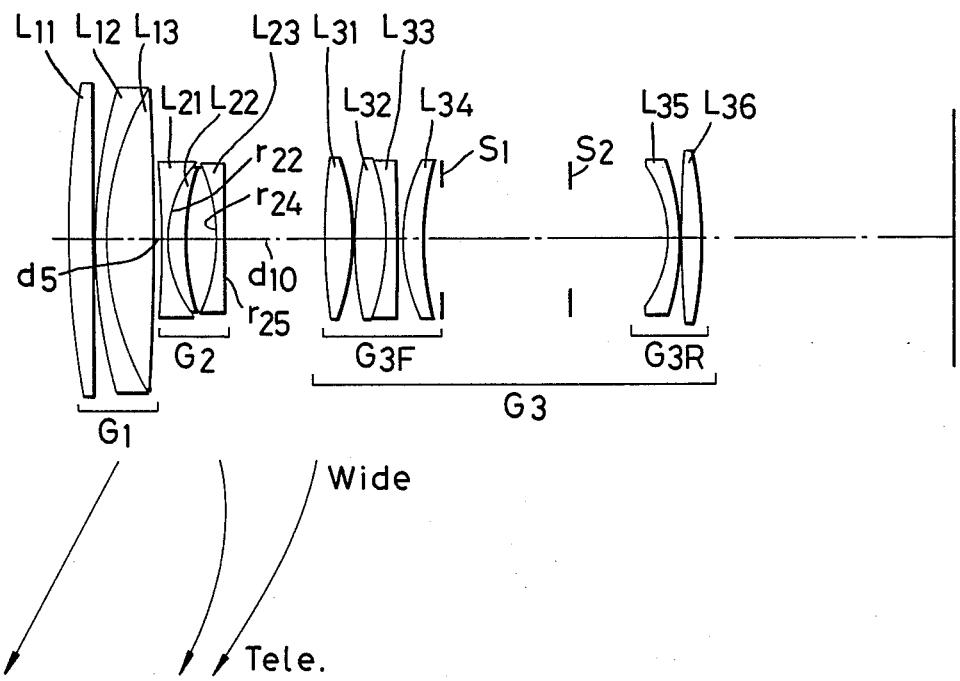
FIG. 2 shows a lens construction used for the description of second, third and fourth embodiments of the present invention.

FIG. 2 shows the lens construction according to second, third and fourth embodiments of the present invention. In FIG. 2, a first lens group G1 comprises, in

First Embodiment
$f = 71.500–205.000$
F-number 4.1–5.5

| No. | Radius of curvature r | | Center thickness and space d | | Refractive index n | | Abbe number $\nu$ | | |
|---|---|---|---|---|---|---|---|---|---|
| 1 | $r_{11}$ | 153.845 | $d_1$ | 2.300 | $n_{11}$ | 1.80458 | 25.5 | $L_{11}$ | |
| 2 | $r_{12}$ | 71.737 | $d_2$ | 5.800 | $n_{12}$ | 1.51680 | 64.1 | $L_{12}$ | |
| 3 | $r_{13}$ | −449.462 | $d_3$ | 0.100 | | | | | $G_1$ |
| 4 | $r_{14}$ | 107.481 | $d_4$ | 4.600 | $n_{13}$ | 1.51680 | 64.1 | $L_{13}$ | |
| 5 | $r_{15}$ | −278.364 | $d_5$ | (variable) | | | | | |
| 6 | $r_{21}$ | −228.633 | $d_6$ | 1.200 | $n_{21}$ | 1.69350 | 53.8 | $L_{21}$ | |
| 7 | $r_{22}$ | 18.350 | $d_7$ | 4.000 | $n_{22}$ | 1.80458 | 25.5 | $L_{22}$ | |
| 8 | $r_{23}$ | 45.502 | $d_8$ | 3.800 | | | | | $G_2$ |
| 9 | $r_{24}$ | −33.847 | $d_9$ | 1.200 | $n_{23}$ | 1.69350 | 53.8 | $L_{23}$ | |
| 10 | $r_{25}$ | 550.868 | $d_{10}$ | (variable) | | | | | |
| 11 | $r_{31}$ | 104.039 | $d_{11}$ | 4.200 | $n_{31}$ | 1.49782 | 82.6 | $L_{31}$ | |
| 12 | $r_{32}$ | −38.434 | $d_{12}$ | 0.200 | | | | | |
| 13 | $r_{33}$ | 52.401 | $d_{13}$ | 5.500 | $n_{32}$ | 1.48749 | 70.2 | $L_{32}$ | |
| 14 | $r_{34}$ | −31.880 | $d_{14}$ | 1.400 | $n_{33}$ | 1.74000 | 28.3 | $L_{33}$ | |
| 15 | $r_{35}$ | −126.224 | $d_{15}$ | 0.800 | | | | | |
| 16 | $r_{36}$ | 32.945 | $d_{16}$ | 4.600 | $n_{34}$ | 1.62041 | 60.3 | $L_{34}$ | $G_3$ |
| 17 | $r_{37}$ | 182.768 | $d_{17}$ | 13.100 | | | | | |
| 18 | $r_{38}$ | −181.312 | $d_{18}$ | 1.600 | $n_{35}$ | 1.76684 | 46.8 | $L_{35}$ | |
| 19 | $r_{39}$ | 24.638 | $d_{19}$ | 9.800 | | | | | |
| 20 | $r_{40}$ | 113.747 | $d_{20}$ | 3.200 | $n_{36}$ | 1.62588 | 35.6 | $L_{36}$ | |
| 21 | $r_{41}$ | −66.352 | | | | | | | |

| f | 71.500 | 115.000 | 205.000 |
|---|---|---|---|
| d 5 | 1.782 | 24.276 | 38.607 |
| d 10 | 16.005 | 9.748 | 0.640 |
| B f | 55.650 | 63.190 | 83.289 |

$f_1/f_W = 1.566$
$|f_2/f_W| = 0.373$
$f_3/f_W = 0.483$ $$\left| \frac{1}{\beta_{2W}} - \frac{1}{\beta_{2T}} \right| = 1.383$$

$\beta_{2W}/\beta_{2T} = 0.505$ $$\left| \frac{1}{\beta_{3W}} - \frac{1}{\beta_{3T}} \right| = 0.174$$

$\beta_{3W}/\beta_{3T} = 0.690$
$f_{3F}/f_3 = 0.757$
$|f_{3R}/f_3| = 1.963$
$f_{3F}/f_{31} = 0.459$ The above values satisfy the conditions of expressions (1)–(10), (4') and (5').

The values of conditions (11)–(13) about the second lens group G2 are as follows:

$n_{22} = 1.80458$
$r_{22}/f_2 = -0.688$ succession from the object side, a positive lens L11 having its surface of sharper curvature facing the object side, a negative meniscus lens L12 having its convex surface facing the object side and a positive lens L13 joined thereto and having its convex surface of sharper curvature facing the object side, a second lens group G2 comprises, in succession from the object side, a negative first lens L21 having its surface of sharper curvature facing the image side, a positive meniscus second lens L22 joined thereto and having its convex surface facing the object side and a negative lens L23 having its surface of sharper curvature facing the object side, a forward group G3F in a third lens group G3 comprises, in succession from the object side, a positive lens L31 having its convex surface of sharper curvature facing the image side, a biconvex positive lens L32, a negative lens L33 joined thereto and having its surface of sharper curvature facing the object side and a positive meniscus lens L34 having its convex surface facing the object side, and a rearward group G3R in the third lens group comprises a negative meniscus lens L35 having its convex surface facing the image side and a positive lens L36 having its surface of sharper curvature facing the image side.

A variable stop S1 and a fixed stop S2 are disposed between the forward group G3F and the rearward group G3R in the third lens group G3.

Also shown in FIG. 2 is the movement locus of each lens group when zooming is effected from the wide angle side to the telephoto side. The first lens group is linearly moved toward the object side, the second lens group is moved toward the image side while depicting a convex non-linear locus, and the third lens group is non-linearly moved toward the object side. The numerical data of the second, third and fourth embodiments of the present invention will be shown below.

Second Embodiment
$f = 71.500-205.000$
F-number 4.1–5.5

| No. | | Radius of curvature r | | Center thickness and space d | | Refractive index n | Abbe number $\nu$ | | |
|---|---|---|---|---|---|---|---|---|---|
| 1 | $r_{11}$ | 120.465 | $d_1$ | 3.700 | $n_{11}$ | 1.51680 | 64.1 | $L_{11}$ | |
| 2 | $r_{12}$ | 1885.001 | $d_2$ | 0.100 | | | | | $G_1$ |
| 3 | $r_{13}$ | 87.589 | $d_3$ | 2.000 | $n_{12}$ | 1.80458 | 25.5 | $L_{12}$ | |
| 4 | $r_{14}$ | 52.453 | $d_4$ | 7.600 | $n_{13}$ | 1.51680 | 64.1 | $L_{13}$ | |
| 5 | $r_{15}$ | −413.504 | $d_5$ | (variable) | | | | | |
| 6 | $r_{21}$ | −150.683 | $d_6$ | 1.200 | $n_{21}$ | 1.65160 | 58.5 | $L_{21}$ | |
| 7 | $r_{22}$ | 20.543 | $d_7$ | 3.400 | $n_{22}$ | 1.86074 | 23.0 | $L_{22}$ | |
| 8 | $r_{23}$ | 36.361 | $d_8$ | 4.200 | | | | | $G_2$ |
| 9 | $r_{24}$ | −35.217 | $d_9$ | 1.200 | $n_{23}$ | 1.65160 | 58.5 | $L_{23}$ | |
| 10 | $r_{25}$ | 5931.968 | $d_{10}$ | (variable) | | | | | |
| 11 | $r_{31}$ | 106.024 | $d_{11}$ | 4.500 | $n_{31}$ | 1.50137 | 56.5 | $L_{31}$ | |
| 12 | $r_{32}$ | −37.807 | $d_{12}$ | 0.200 | | | | | |
| 13 | $r_{33}$ | 65.312 | $d_{13}$ | 5.300 | $n_{32}$ | 1.51860 | 70.1 | $L_{32}$ | |
| 14 | $r_{34}$ | −31.533 | $d_{14}$ | 1.400 | $n_{33}$ | 1.75520 | 27.6 | $L_{33}$ | |
| 15 | $r_{35}$ | −393.056 | $d_{15}$ | 0.800 | | | | | |
| 16 | $r_{36}$ | 29.359 | $d_{16}$ | 3.600 | $n_{34}$ | 1.69350 | 53.8 | $L_{34}$ | $G_3$ |
| 17 | $r_{37}$ | 46.171 | $d_{17}$ | 40.200 | | | | | |
| 18 | $r_{38}$ | −18.228 | $d_{18}$ | 2.100 | $n_{35}$ | 1.77279 | 49.4 | $L_{35}$ | |
| 19 | $r_{39}$ | −29.161 | $d_{19}$ | 0.200 | | | | | |
| 20 | $r_{40}$ | 1024.571 | $d_{20}$ | 2.800 | $n_{36}$ | 1.69895 | 30.1 | $L_{36}$ | |
| 21 | $r_{41}$ | −73.471 | | | | | | | |
| f | | | 71.500 | | 115.000 | | | 205.000 | |
| d 5 | | | 1.400 | | 24.501 | | | 36.417 | |
| d 10 | | | 16.800 | | 10.418 | | | 0.946 | |
| B f | | | 41.267 | | 46.675 | | | 69.107 | |

$f_1/f_W = 1.567$
$|f_2/f_W| = 0.373$
$f_3/f_W = 0.483$ $$\left| \frac{1}{\beta_{2W}} - \frac{1}{\beta_{2T}} \right| = 1.309$$

$$\beta_{2W}/\beta_{2T} = 0.513$$

$$\left| \frac{1}{\beta_{3W}} - \frac{1}{\beta_{3T}} \right| = 0.186$$

$\beta_{3W}/\beta_{3T} = 0.680$
$f_{3F}/f_3 = 0.989$
$|f_{3R}/f_3| = 8.028$
$f_{3F}/f_{31} = 0.607$ The above values satisfy conditions (1)–(10), (4') and (5').
Also,
$n_{22} = 1.86074$
$r_2/f_2 = -0.770$
$(r_{25} + r_{24})/(r - r_{24}) = 0.9867$
The above values satisfy conditions (11)–(13).

Third Embodiment
f = 71.500–205.000
F-number 4.1–5.5

| No. | | Radius of curvature r | | Center thickness and space d | | Refractive index n | Abbe number $\nu$ | | |
|---|---|---|---|---|---|---|---|---|---|
| 1 | $r_{11}$ | 124.745 | $d_1$ | 3.700 | $n_{11}$ | 1.51680 | 64.1 | $L_{11}$ | |
| 2 | $r_{12}$ | 4325.365 | $d_2$ | 0.100 | | | | | $G_1$ |
| 3 | $r_{13}$ | 87.610 | $d_3$ | 2.000 | $n_{12}$ | 1.80458 | 25.5 | $L_{12}$ | |
| 4 | $r_{14}$ | 52.453 | $d_4$ | 7.700 | $n_{13}$ | 1.51680 | 64.1 | $L_{13}$ | |
| 5 | $r_{15}$ | −416.542 | $d_5$ | (variable) | | | | | |
| 6 | $r_{21}$ | −150.751 | $d_6$ | 1.200 | $n_{21}$ | 1.65160 | 58.5 | $L_{21}$ | |
| 7 | $r_{22}$ | 20.543 | $d_7$ | 3.400 | $n_{22}$ | 1.86074 | 23.0 | $L_{22}$ | $G_2$ |
| 8 | $r_{23}$ | 36.370 | $d_8$ | 4.200 | | | | | |
| 9 | $r_{24}$ | −35.484 | $d_9$ | 1.200 | $n_{23}$ | 1.65160 | 58.5 | $L_{23}$ | |
| 10 | $r_{25}$ | 2543.972 | $d_{10}$ | (variable) | | | | | |
| 11 | $r_{31}$ | 103.308 | $d_{11}$ | 4.500 | $n_{31}$ | 1.50137 | 56.5 | $L_{31}$ | |
| 12 | $r_{32}$ | −38.149 | $d_{12}$ | 0.200 | | | | | |
| 13 | $r_{33}$ | 64.331 | $d_{13}$ | 5.300 | $n_{32}$ | 1.51860 | 70.1 | $L_{32}$ | |
| 14 | $r_{34}$ | −31.533 | $d_{14}$ | 1.400 | $n_{33}$ | 1.75520 | 27.6 | $L_{33}$ | |
| 15 | $r_{35}$ | −368.870 | $d_{15}$ | 0.800 | | | | | $G_3$ |
| 16 | $r_{36}$ | 29.048 | $d_{16}$ | 3.600 | $n_{34}$ | 1.69350 | 53.8 | $L_{34}$ | |
| 17 | $r_{37}$ | 44.423 | $d_{17}$ | 40.200 | | | | | |
| 18 | $r_{38}$ | −18.138 | $d_{18}$ | 2.100 | $n_{35}$ | 1.76684 | 46.8 | $L_{35}$ | |
| 19 | $r_{39}$ | −28.876 | $d_{19}$ | 0.200 | | | | | |
| 20 | $r_{40}$ | −4032.012 | $d_{20}$ | 2.800 | $n_{36}$ | 1.72825 | 28.3 | $L_{36}$ | |
| 21 | $r_{41}$ | −71.662 | | | | | | | |

| f | 71.500 | 135.000 | 205.006 |
|---|---|---|---|
| d 5 | 1.741 | 28.503 | 36.546 |
| d 10 | 16.985 | 7.923 | 1.065 |
| B f | 40.922 | 51.636 | 68.755 |

$f_1/f_W = 1.567$
$|f_2/f_W| = 0.373$
$f_3/f_W = 0.483$ $$\left| \frac{1}{\beta_{2W}} - \frac{1}{\beta_{2T}} \right| = 1.305$$

$\beta_{2W}/\beta_{2T} = 0.513$ $$\left| \frac{1}{\beta_{3W}} - \frac{1}{\beta_{3T}} \right| = 0.188$$

$\beta_{3W}/\beta_{3T} = 0.679$
$f_{3F}/f_2 = 0.989$
$|f_{3R}/f_3| = 7.957$
$f_{3F}/f_{31} = 0.608$ The above values satisfy conditions (1)–(10), (4') and (5').
Also,
$n_{22} = 1.86074$
$r_2/f_2 = -0.770$
$(r_{25}+r_{24})/(r_{25}-r_{24}) = 0.9725$
The above values satisfy conditions (11)–(13).

Fourth Embodiment
f = 71.500–204.999
F-number 4.1–5.5

| No. | | Radius of curvature r | | Center thickness and space d | | Refractive index n | Abbe number $\nu$ | | |
|---|---|---|---|---|---|---|---|---|---|
| 1 | $r_{11}$ | 98.438 | $d_1$ | 3.500 | $n_{11}$ | 1.46450 | 65.8 | $L_{11}$ | |
| 2 | $r_{12}$ | 802.616 | $d_2$ | 0.100 | | | | | $G_1$ |
| 3 | $r_{13}$ | 76.116 | $d_3$ | 2.000 | $n_{12}$ | 1.80458 | 25.5 | $L_{12}$ | |
| 4 | $r_{14}$ | 44.695 | $d_4$ | 7.300 | $n_{13}$ | 1.51835 | 60.3 | $L_{13}$ | |
| 5 | $r_{15}$ | −279.389 | $d_5$ | (variable) | | | | | |
| 6 | $r_{21}$ | −128.684 | $d_6$ | 1.200 | $n_{21}$ | 1.65160 | 58.5 | $L_{21}$ | |
| 7 | $r_{22}$ | 20.994 | $d_7$ | 3.200 | $n_{22}$ | 1.86074 | 23.0 | $L_{22}$ | $G_2$ |
| 8 | $r_{23}$ | 37.184 | $d_8$ | 4.100 | | | | | |
| 9 | $r_{24}$ | −37.845 | $d_9$ | 1.200 | $n_{23}$ | 1.65160 | 58.5 | $L_{23}$ | |
| 10 | $r_{25}$ | 6107.025 | $d_{10}$ | (variable) | | | | | |
| 11 | $r_{31}$ | 119.160 | $d_{11}$ | 4.300 | $n_{31}$ | 1.50137 | 56.5 | $L_{31}$ | |
| 12 | $r_{32}$ | −37.088 | $d_{12}$ | 0.200 | | | | | |
| 13 | $r_{33}$ | 71.445 | $d_{13}$ | 5.300 | $n_{32}$ | 1.51860 | 70.1 | $L_{32}$ | |
| 14 | $r_{34}$ | −29.228 | $d_{14}$ | 1.400 | $n_{33}$ | 1.75520 | 27.6 | $L_{33}$ | |
| 15 | $r_{35}$ | −333.136 | $d_{15}$ | 0.800 | | | | | |

-continued

Fourth Embodiment
f = 71.500–204.999
F-number 4.1–5.5

| 16 | $r_{36}$ | 22.903 | $d_{16}$ | 3.600 | $n_{34}$ | 1.54814 | 45.9 | $L_{34}$ | $G_3$ |
| --- | --- | --- | --- | --- | --- | --- | --- | --- | --- |
| 17 | $r_{37}$ | 38.213 | $d_{17}$ | 34.800 | | | | | |
| 18 | $r_{38}$ | −15.897 | $d_{18}$ | 2.100 | $n_{35}$ | 1.77279 | 49.4 | $L_{35}$ | |
| 19 | $r_{39}$ | −24.699 | $d_{19}$ | 0.200 | | | | | |
| 20 | $r_{40}$ | −306.837 | $d_{20}$ | 2.800 | $n_{36}$ | 1.86074 | 23.0 | $L_{36}$ | |
| 21 | $r_{41}$ | −82.419 | | | | | | | |

| f | 71.500 | 135.000 | 204.999 |
| --- | --- | --- | --- |
| d 5 | 2.250 | 22.806 | 29.375 |
| d 10 | 19.898 | 8.849 | 0.957 |
| B f | 41.337 | 53.103 | 69.563 |

$f_1/f_W = 1.385$
$|f_2/f_W| = 0.381$
$f_3/f_W = 0.483$ $$\left| \frac{1}{\beta_{2W}} - \frac{1}{\beta_{2T}} \right| = 0.993$$

$\beta_{2W}/\beta_{2T} = 0.534$ $$\left| \frac{1}{\beta_{3W}} - \frac{1}{\beta_{3T}} \right| = 0.225$$

$\beta_{3W}/\beta_{3T} = 0.653$
$f_{3F}/f_3 = 0.996$
$|f_{3R}/f_3| = 4.065$
$f_{3F}/f_{31} = 0.603$
$n_{22} = 1.86074$
$r_{22}/f_2 = -0.769$ $$\frac{r_{25} + r_{24}}{r_{25} - r_{24}} = 0.988$$

The above values satisfy conditions (1)–(13).

Figure 3:
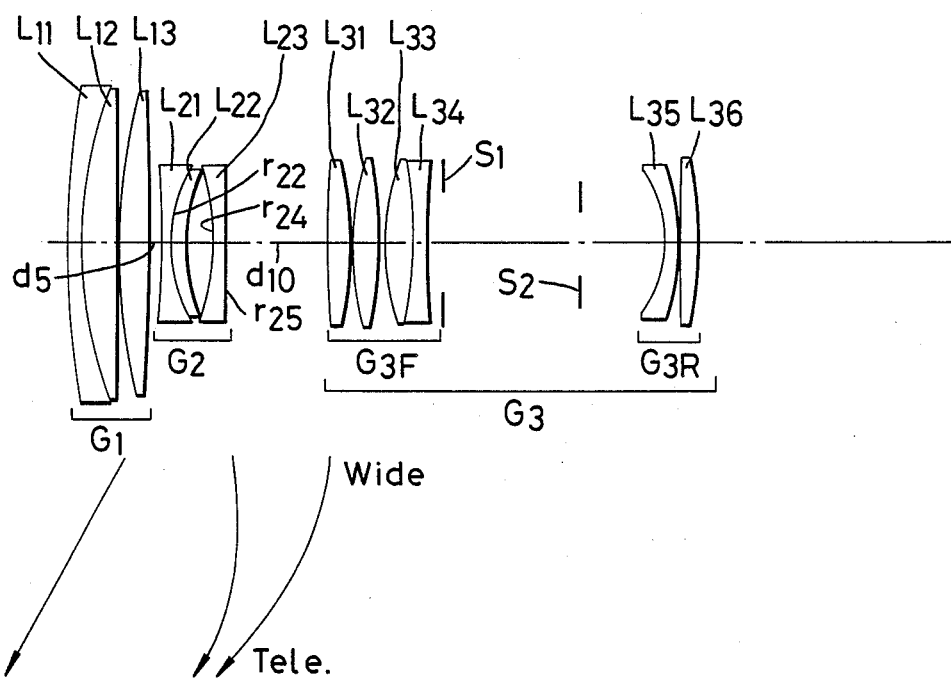
FIG. 3 shows a lens construction according to a fifth embodiment of the present invention.

In a fifth embodiment of the present invention, as shown in FIG. 3, a first lens group G1 comprises, in succession from the object side, a negative meniscus lens L11 having its convex surface facing the object side, a positive lens L12 joined thereto and having its surface of sharper curvature facing the object side, and a biconvex positive lens L13, a second lens group G2 comprises, in succession from the object side, a negative first lens L21 having its surface of sharper curvature facing the image side, a positive meniscus second lens L22 joined thereto and having its convex surface facing the object side, and a negative third lens L23 having its surface of sharper curvature facing the object side, and a third lens group G3 comprises a forward group G3F comprising, in succession from the object side, a biconvex positive lens L31, a biconvex positive lens L32, a biconvex positive lens L33 and a biconcave negative lens L34 joined thereto, and a rearward group G3R comprising a negative meniscus lens L35 having its surface of sharper curvature facing the object side and a positive lens L36 having its surface of sharper curvature facing the image side.

In the fifth embodiment, as shown in FIG. 3, a variable stop S1 and a fixed stop S2 are provided between the forward group G3F and the rearward group G3R in the third lens group G3.

Also shown in FIG. 3 is the movement locus of each lens group when zooming is effected from the wide angle side to the telephoto side. The first lens group is linearly moved toward the object side, the second lens group is moved toward the image side while depicting a convex non-linear locus, and the third lens group is non-linearly moved toward the object side.

The numerical data of the fifth embodiment of the present invention will be shown below. In the table below, the numbers at the left end represent the order from the object side, f represents the focal length of the entire system, and Bf represents the back focal length.

Fifth Embodiment
f = 71.500–205.000
F-number 4.1–5.5

| No. | | Radius of curvature r | | Center thickness and space d | | Refractive index n | Abbe number $\nu$ | | |
| --- | --- | --- | --- | --- | --- | --- | --- | --- | --- |
| 1 | $r_{11}$ | 118.310 | $d_1$ | 2.300 | $n_{11}$ | 1.80458 | 25.5 | $L_{11}$ | |
| 2 | $r_{12}$ | 63.790 | $d_2$ | 6.000 | $n_{12}$ | 1.51680 | 64.1 | $L_{12}$ | |
| 3 | $r_{13}$ | 1325.679 | $d_3$ | 0.100 | | | | | $G_1$ |
| 4 | $r_{14}$ | 95.278 | $d_4$ | 5.400 | $n_{13}$ | 1.51680 | 64.1 | $L_{13}$ | |
| 5 | $r_{15}$ | −289.179 | $d_5$ | (variable) | | | | | |
| 6 | $r_{21}$ | −155.511 | $d_6$ | 1.200 | $n_{21}$ | 1.69160 | 58.5 | $L_{21}$ | |
| 7 | $r_{22}$ | 20.550 | $d_7$ | 3.400 | $n_{22}$ | 1.86074 | 23.0 | $L_{22}$ | $G_2$ |
| 8 | $r_{23}$ | 36.637 | $d_8$ | 4.200 | | | | | |

-continued

Fifth Embodiment
f = 71.500–205.000
F-number 4.1–5.5

| | | | | | | | |
|---|---|---|---|---|---|---|---|
| 9 | $r_{24}$ | −34.912 | $d_9$ | 1.200 | $n_{23}$ 1.65160 | 58.5 | $L_{23}$ |
| 10 | $r_{25}$ | 2426.367 | $d_{10}$ | (variable) | | | |
| 11 | $r_{31}$ | 115.890 | $d_{11}$ | 3.500 | $n_{31}$ 1.51860 | 70.1 | $L_{31}$ |
| 12 | $r_{32}$ | −84.561 | $d_{12}$ | 0.200 | | | |
| 13 | $r_{33}$ | 50.935 | $d_{13}$ | 4.300 | $n_{32}$ 1.48749 | 70.2 | $L_{32}$ |
| 14 | $r_{34}$ | −88.680 | $d_{14}$ | 0.800 | | | |
| 15 | $r_{35}$ | 38.863 | $d_{15}$ | 5.200 | $n_{33}$ 1.51680 | 64.1 | $L_{33}$ |
| 16 | $r_{36}$ | −54.825 | $d_{16}$ | 1.400 | $n_{34}$ 1.78470 | 26.1 | $L_{34}$ |
| 17 | $r_{37}$ | 145.469 | $d_{17}$ | 39.800 | | | |
| 18 | $r_{38}$ | −19.312 | $d_{18}$ | 2.100 | $n_{35}$ 1.77279 | 49.4 | $L_{35}$ |
| 19 | $r_{39}$ | −32.084 | $d_{19}$ | 0.200 | | | |
| 20 | $r_{40}$ | −701.705 | $d_{20}$ | 2.800 | $n_{36}$ 1.74077 | 27.6 | $L_{36}$ |
| 21 | $r_{41}$ | −64.629 | | | | | |

| | 71.500 | 115.000 | 205.000 |
|---|---|---|---|
| f | 71.500 | 115.000 | 205.000 |
| d 5 | 1.586 | 25.921 | 37.783 |
| d 10 | 17.300 | 11.136 | 1.853 |
| B f | 42.725 | 47.511 | 70.890 |

$f_1/f_W = 1.566$
$|f_2/f_W| = 0.373$
$f_3/f_W = 0.483$ $$\left| \frac{1}{\beta_{2W}} - \frac{1}{\beta_{2T}} \right| = 1.360$$

$\beta_{2W}/\beta_{2T} = 0.509$ $$\left| \frac{1}{\beta_{3W}} - \frac{1}{\beta_{3T}} \right| = 0.179$$

$\beta_{3W}/\beta_{3T} = 0.684$
$f_{3F}/f_3 = 0.989$
$|f_{3R}/f_3| = 8.131$
$f_{3F}f_{31} = 0.360$
$n_{22} = 1.86074$
$r_{22}/f_2 = -0.770$ $$\frac{r_{25} + r_{24}}{r_{25} - r_{24}} = 0.972$$

The above values satisfy conditions (1)–(13), (4′) and (5′).

Figure 4:
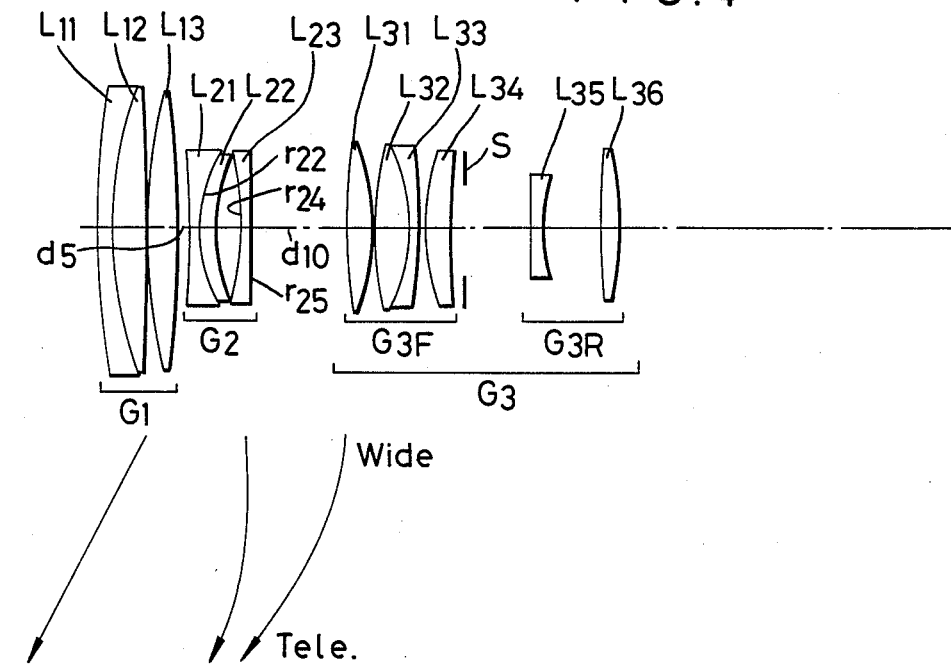
FIG. 4 shows a lens construction according to a sixth embodiment of the present invention.

FIG. 4 shows a lens construction according to a sixth embodiment of the present invention in which the second lens group G2 in the first embodiment shown in FIG. 1 is improved to satisfy conditions (11)–(13).

In FIG. 4, a first lens group G1 comprises, in succession from the object side, a negative meniscus lens L11 having its convex surface facing the object side, a positive lens L12 joined thereto and having its surface of sharper curvature facing the object side, and a biconvex positive lens L13, a second lens group G2 comprises, in succession from the object side, a negative first lens L21 having its surface of sharper curvature facing the image side, a positive meniscus second lens L22 joined thereto and having its convex surface facing the object side, and a negative third lens L23 having its surface of sharper curvature facing the image side, and a third lens group G3 comprises a forward group G3F comprising, in succession from the object side, a positive lens L31 having its surface of sharper curvature facing the image side, a biconvex positive lens L32, a negative meniscus lens L33 joined thereto and having its convex surface facing the image side, and a positive meniscus lens L34 having its convex surface facing the object side, and a rearward group G3R comprising a negative lens L35 having its surface of sharper curvature facing the image side and a positive lens L36 having its surface of sharper curvature facing the image side.

In the sixth embodiment, as shown in FIG. 4, a stop S is disposed between the forward group G3F and the rearward group G3R in the third lens group G3.

Also shown in FIG. 4 is the movement locus of each lens group when zooming is effected from the wide angle side to the telephoto side. The first lens group is linearly moved toward the object side, the second lens group is moved toward the image side while depicting a convex non-linear locus, and the third lens group is non-linearly moved toward the object side.

The numerical data of the sixth embodiment of the present invention will be shown below.

Sixth Embodiment
f = 71.500–205.000
F-number 4.1–5.5

| No. | Radius of curvature r | Center thickness and space d | Refractive index n | Abbe number ν |
|---|---|---|---|---|

-continued

Sixth Embodiment

| | | | | | | | | | |
|---|---|---|---|---|---|---|---|---|---|
| 1 | $r_1$ | 153.844 | $d_1$ | 2.300 | $n_{11}$ | 1.80458 | 25.5 | $L_{11}$ | ⎤ |
| 2 | $r_{12}$ | 71.737 | $d_2$ | 5.800 | $n_{12}$ | 1.51680 | 64.1 | $L_{12}$ | |
| 3 | $r_{13}$ | −449.461 | $d_3$ | 0.100 | | | | | $G_1$ |
| 4 | $r_{14}$ | 107.481 | $d_4$ | 4.600 | $n_{13}$ | 1.51680 | 64.1 | $L_{13}$ | ⎦ |
| 5 | $r_{15}$ | −278.364 | $d_5$ | (variable) | | | | | |
| 6 | $r_{21}$ | −207.164 | $d_6$ | 1.200 | $n_{21}$ | 1.69350 | 53.8 | $L_{21}$ | ⎤ |
| 7 | $r_{22}$ | 20.395 | $d_7$ | 4.000 | $n_{22}$ | 1.86074 | 23.0 | $L_{22}$ | |
| 8 | $r_{23}$ | 40.805 | $d_8$ | 4.000 | | | | | $G_2$ |
| 9 | $r_{24}$ | −32.559 | $d_9$ | 1.200 | $n_{23}$ | 1.69350 | 53.8 | $L_{23}$ | ⎦ |
| 10 | $r_{25}$ | −687.887 | $d_{10}$ | (variable) | | | | | |
| 11 | $r_{31}$ | 104.039 | $d_{11}$ | 4.200 | $n_{31}$ | 1.49782 | 82.6 | $L_{31}$ | ⎤ |
| 12 | $r_{32}$ | −38.434 | $d_{12}$ | 0.200 | | | | | |
| 13 | $r_{33}$ | 52.401 | $d_{13}$ | 5.500 | $n_{32}$ | 1.48749 | 70.2 | $L_{32}$ | |
| 14 | $r_{34}$ | −31.880 | $d_{14}$ | 1.400 | $n_{33}$ | 1.74000 | 28.3 | $L_{33}$ | |
| 15 | $r_{35}$ | −126.223 | $d_{15}$ | 0.800 | | | | | $G_3$ |
| 16 | $r_{36}$ | 32.945 | $d_{16}$ | 4.600 | $n_{34}$ | 1.62041 | 60.3 | $L_{34}$ | |
| 17 | $r_{37}$ | 182.768 | $d_{17}$ | 13.100 | | | | | |
| 18 | $r_{38}$ | −181.312 | $d_{18}$ | 1.600 | $n_{35}$ | 1.76684 | 46.8 | $L_{35}$ | |
| 19 | $r_{39}$ | 24.638 | $d_{19}$ | 9.800 | | | | | |
| 20 | $r_{40}$ | 113.747 | $d_{20}$ | 3.200 | $n_{36}$ | 1.62588 | 35.6 | $L_{36}$ | ⎦ |
| 21 | $r_{41}$ | −66.352 | | | | | | | |

| | | | |
|---|---|---|---|
| f | 71.500 | 115.000 | 205.000 |
| d 5 | 1.825 | 24.320 | 38.650 |
| d 10 | 15.816 | 9.559 | 0.452 |
| B f | 55.650 | 63.190 | 83.289 |

$f_1/f_W = 1.566$
$|f_2/f_W| = 0.373$
$f_3/f_W = 0.483$ $$\left| \frac{1}{\beta_{2W}} - \frac{1}{\beta_{2T}} \right| = 1.383$$

$\beta_{2W}/\beta_{2T} = 0.505$ $$\left| \frac{1}{\beta_{3W}} - \frac{1}{\beta_{3T}} \right| = 0.174$$

$\beta_{3W}/\beta_{3T} = 0.690$
$f_{3F}/f_3 = 0.757$
$|f_{3R}/f_3| = 1.963$
$f_{3F}/f_{31} = 0.459$
$n_{22} = 1.86074$
$r_{22}/f_2 = -0.764$ $$\frac{r_{25} + r_{24}}{r_{25} - r_{24}} = 1.099$$

The above values all satisfy conditions (1)–(13), (4') and (5').

Figure 5:
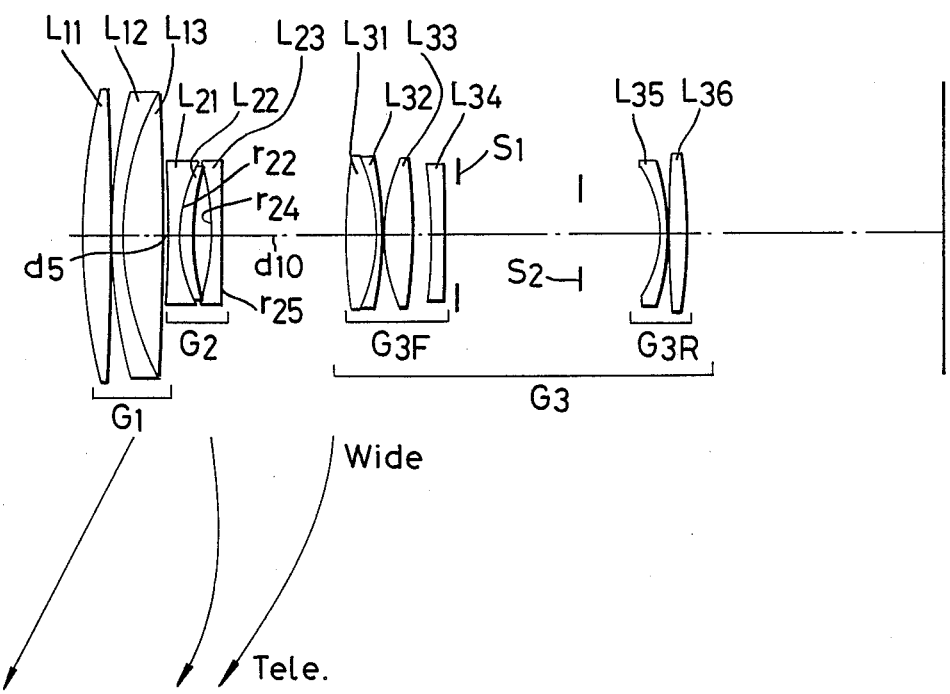
FIG. 5 shows a lens construction according to a seventh embodiment of the present invention.

FIG. 5 shows a lens construction according to a seventh embodiment of the present invention in which the construction of the forward group G3F in the third lens group shown in FIG. 3 is changed.

In FIG. 5, a first lens group G1 comprises, in succession from the object side, a positive lens L11 having its surface of sharper curvature facing the object side, a negative meniscus lens L12 having its convex surface facing the object side, and a positive lens L13 joined thereto and having its surface of sharper curvature facing the object side, a second lens group G2 comprises, in succession from the object side, a negative first lens L21 having its surface of sharper curvature facing the image side, a positive meniscus second lens L22 joined thereto and having its convex surface facing the object side, and a negative third lens L23 having its surface of sharper curvature facing the object side, and a third lens group G3 comprises a forward group G3F comprising, in succession from the object side, a positive lens L31 having its surface of sharper curvature facing the image side, a negative meniscus lens L32 joined thereto and having its convex surface facing the image side, a biconvex positive lens L33 having its surface of sharper curvature facing the object side, and a negative lens L34 having its surface of sharper curvature facing the object side, and a rearward group G3R comprising a negative meniscus lens L35 having its convex surface facing the image side and a positive lens L36 having its surface of sharper curvature facing the image side. A variable stop S1 and a fixed stop S2 are provided between the forward group G3F and the rearward group G3R.

As described above, in the seventh embodiment, the forward group G3F in the third lens group G3 entirely differs from the constructions shown in FIGS. 1 to 4. Therefore, condition (10) is not satisfied. However, coma and spherical aberration based on condition (10) are corrected well by the unique construction of the forward group G3F.

Also shown in FIG. 5 is the movement locus of each lens group when zooming is effected from the wide angle side to the telephoto side. The first lens group is linearly moved toward the object side, the second lens group is moved toward the image side while depicting a convex non-linear locus, and the third lens group is non-linearly moved toward the object side.

The numerical data of the seventh embodiment of the present invention will be shown below.

Seventh Embodiment
$f = 72.318$-$205.565$
F-number 4.5-5.0

| No. | Radius of curvature r | | Center thickness and space d | | Refractive index n | | Abbe number $\nu$ | | |
|---|---|---|---|---|---|---|---|---|---|
| 1 | $r_{11}$ | 107.200 | $d_1$ | 3.850 | $n_{11}$ | 1.51680 | 64.1 | $L_{11}$ | $G_1$ |
| 2 | $r_{12}$ | $-1450.001$ | $d_2$ | 0.200 | | | | | |
| 3 | $r_{13}$ | 79.420 | $d_3$ | 1.950 | $n_{12}$ | 1.80518 | 25.4 | $L_{12}$ | |
| 4 | $r_{14}$ | 47.810 | $d_4$ | 6.300 | $n_{13}$ | 1.51680 | 64.1 | $L_{13}$ | |
| 5 | $r_{15}$ | $-1449.991$ | $d_5$ | (variable) | | | | | |
| 6 | $r_{21}$ | $-203.083$ | $d_6$ | 1.000 | $n_{21}$ | 1.69680 | 55.6 | $L_{21}$ | $G_2$ |
| 7 | $r_{22}$ | 20.547 | $d_7$ | 3.860 | $n_{22}$ | 1.86074 | 23.0 | $L_{22}$ | |
| 8 | $r_{23}$ | 37.163 | $d_8$ | 3.200 | | | | | |
| 9 | $r_{24}$ | $-38.171$ | $d_9$ | 1.000 | $n_{23}$ | 1.69680 | 55.6 | $L_{23}$ | |
| 10 | $r_{25}$ | $-497.113$ | $d_{10}$ | (variable) | | | | | |
| 11 | $r_{31}$ | 85.720 | $d_{11}$ | 4.550 | $n_{31}$ | 1.61272 | 58.6 | $L_{31}$ | $G_3$ |
| 12 | $r_{32}$ | $-31.160$ | $d_{12}$ | 1.000 | $n_{32}$ | 1.71736 | 29.5 | $L_{32}$ | |
| 13 | $r_{33}$ | $-54.350$ | $d_{13}$ | 0.200 | | | | | |
| 14 | $r_{34}$ | 27.615 | $d_{14}$ | 5.160 | $n_{33}$ | 1.48749 | 70.2 | $L_{33}$ | |
| 15 | $r_{35}$ | $-88.000$ | $d_{15}$ | 2.940 | | | | | |
| 16 | $r_{36}$ | $-55.000$ | $d_{16}$ | 2.000 | $n_{34}$ | 1.75520 | 27.6 | $L_{34}$ | |
| 17 | $r_{37}$ | 0.000 | $d_{17}$ | 36.100 | | | | | |
| 18 | $r_{38}$ | $-17.300$ | $d_{18}$ | 1.270 | $n_{35}$ | 1.69680 | 55.6 | $L_{35}$ | |
| 19 | $r_{39}$ | $-30.500$ | $d_{19}$ | 0.200 | | | | | |
| 20 | $r_{40}$ | 700.000 | $d_{20}$ | 2.480 | $n_{36}$ | 1.71736 | 29.5 | $L_{36}$ | |
| 21 | $r_{41}$ | $-68.001$ | | | | | | | |

| f | 72.818 | 133.831 | 205.565 |
|---|---|---|---|
| d 5 | .939 | 25.106 | 32.939 |
| d 10 | 20.091 | 10.046 | 1.650 |
| B f | 42.052 | 49.813 | 64.511 |

$f_1/f_W = 1.422$
$|f_2/f_W| = 0.380$
$f_3/f_W = 0.478$ $$\left| \frac{1}{\beta_{2W}} - \frac{1}{\beta_{2T}} \right| = 1.155$$

$\beta_{2W}/\beta_{2T} = 0.496$ $$\left| \frac{1}{\beta_{3W}} - \frac{1}{\beta_{3T}} \right| = 0.177$$

$\beta_{3W}/\beta_{3T} = 0.714$
$f_{3F}/f_3 = 1.008$
$|f_{3R}/f_3| = 6.325$
$n_{22} = 1.86074$
$r_{22}/f_2 = -0.742$ $$\frac{r_{25} + r_{24}}{r_{25} - r_{24}} = 1.166$$

The above values satisfy conditions (1)-(9) and (11)-(13) except condition (10).

What is claimed is:

1. A telephoto zoom lens comprising, in succession from the object side, a first lens group having a positive refractive power, a second lens group having a negative refractive power, and a third lens group having a positive refractive power, said lens group being moved independently of each other during zooming and satisfying the following conditions:

$1.3 < f_1/f_W < 1.6$ $0.25 < |f_2/f_W| < 0.45$ $0.44 < f_3/f_W < 0.52$ $1.3 < \left| \frac{1}{\beta_{2W}} - \frac{1}{\beta_{2T}} \right| < 1.55$ $0.5 < \beta_{2W}/\beta_{2T} < 0.6$ $0.1 < \left| \frac{1}{\beta_{3W}} - \frac{1}{\beta_{3T}} \right| < 0.3$ $0.55 < \beta_{3W}/\beta_{3T} < 0.75$ where
$f_W$: the focal length of the entire system at the wide end
$f_1$: the focal length of the first lens group
$f_2$: the focal length of the second lens group
$f_3$: the focal length of the third lens group
$\beta_{2W}$: the imaging magnification at the wide end of the second lens group $\beta_{2T}$: the imaging magnification at the telephoto end of the second lens group $\beta_{3W}$: the imaging magnification at the wide end of the third lens group $\beta_{3T}$: the imaging magnification at the telephoto end of the third lens group.

2. A telephoto zoom lens according to claim 1, wherein said second lens group comprises, in succession from the object side, a negative first lens having its surface of sharper curvature facing the image side, a positive meniscus second lens joined to said first lens and having its convex surface facing the object side, and a negative third lens having its surface of sharper curvature facing the object side, and satisfies the following conditions:

$$1.84 < n_{22} < 1.91$$
$$-0.82 < r_{22}/f_2 < -0.72$$
$$0.8 < \frac{r_{25} + r_{24}}{r_{25} - r_{24}} < 1.3$$

where $n_{22}$: the refractive index of the second lens in the second lens group $f_2$: the focal length of the second lens group $r_{22}$: the radius of curvature of the joined surface of the first lens and the second lens in the second lens group $r_{24}$: the radius of curvature of that surface of the third lens in the second lens group which is adjacent to the image side.

$r_{25}$: the radius of curvature of that surface of the third lens in the second lens group which is adjacent to the image side.

3. A telephoto zoom lens according to claim 1, wherein said third lens group comprises, in succession from the object side, a forward positive lens group and a rearward negative lens group, said forward positive lens group comprising, in succession from the object side, a positive lens having its surface of sharper curvature facing the image side, a biconvex positive lens, a negative lens joined to said biconvex positive lens and having its surface of sharper curvature of facing the object side, and a positive meniscus lens having its convex surface facing the object side, and said third lens group satisfies the following conditions:

$$0.6 < f_{3F}/f_3 < 1.3$$
$$1.5 < |f_{3R}/f_3| < 8.5$$
$$0.35 < f_{3F}/f_{31} < 0.65$$

where $f_{3F}$: the focal length of the forward positive lens group in the third lens group $f_{3R}$: the focal length of the rearward negative lens group in the third lens group $f_{31}$: the focal length of the first lens in the forward positive lens group in the third lens group.

4. A telephoto zoom lens according to claim 1, characterized by the following data:

| f = 71.500–205.000 (focal length of the entire system) F-number 4.1–5.5 | | | | | | |
|---|---|---|---|---|---|---|
| No. | Radius of curvature r | | Center thickness and space d | Refractive index n | Abbe number ν | |
| 1 | $r_{11}$ | 153.845 | $d_1$ 2.300 | $n_{11}$ 1.80458 | 25.5 | $L_{11}$ |
| 2 | $r_{12}$ | 71.737 | $d_2$ 5.800 | $n_{12}$ 1.51680 | 64.1 | $L_{12}$ |
| 3 | $r_{13}$ | −449.462 | $d_3$ 0.100 | | | $G_1$ |
| 4 | $r_{14}$ | 107.481 | $d_4$ 4.600 | $n_{13}$ 1.51680 | 64.1 | $L_{13}$ |
| 5 | $r_{15}$ | −278.364 | $d_5$ (variable) | | | |
| 6 | $r_{21}$ | −228.633 | $d_6$ 1.200 | $n_{21}$ 1.69350 | 53.8 | $L_{21}$ |
| 7 | $r_{22}$ | 18.350 | $d_7$ 4.000 | $n_{22}$ 1.80458 | 25.5 | $L_{22}$ |
| 8 | $r_{23}$ | 45.502 | $d_8$ 3.800 | | | $G_2$ |
| 9 | $r_{24}$ | −33.847 | $d_9$ 1.200 | $n_{23}$ 1.69350 | 53.8 | $L_{23}$ |
| 10 | $r_{25}$ | 550.868 | $d_{10}$ (variable) | | | |
| 11 | $r_{31}$ | 104.039 | $d_{11}$ 4.200 | $n_{31}$ 1.49782 | 82.6 | $L_{31}$ |
| 12 | $r_{32}$ | −38.434 | $d_{12}$ 0.200 | | | |
| 13 | $r_{33}$ | 52.401 | $d_{13}$ 5.500 | $n_{32}$ 1.48749 | 70.2 | $L_{32}$ |
| 14 | $r_{34}$ | −31.880 | $d_{14}$ 1.400 | $n_{33}$ 1.74000 | 28.3 | $L_{33}$ |
| 15 | $r_{35}$ | −126.224 | $d_{15}$ 0.800 | | | |
| 16 | $r_{36}$ | 32.945 | $d_{16}$ 4.600 | $n_{34}$ 1.62041 | 60.3 | $L_{34}$ | $G_3$ |
| 17 | $r_{37}$ | 182.768 | $d_{17}$ 13.100 | | | |
| 18 | $r_{38}$ | −181.312 | $d_{18}$ 1.600 | $n_{35}$ 1.76684 | 46.8 | $L_{35}$ |
| 19 | $r_{39}$ | 24.638 | $d_{19}$ 9.800 | | | |
| 20 | $r_{40}$ | 113.747 | $d_{20}$ 3.200 | $n_{36}$ 1.62588 | 35.6 | $L_{36}$ |
| 21 | $r_{41}$ | −66.352 | | | | |
| f | | 71.500 | | 115.000 | | 205.000 |
| d 5 | | 1.782 | | 24.276 | | 38.607 |
| d 10 | | 16.005 | | 9.748 | | 0.640 |
| B f | | 55.650 | | 63.190 | | 83.289 | the object side

5. A telephoto zoom lens according to claim 1, characterized by the following data:

| f = 71.500–205.000 (focal length of the entire system) F-number 4.1–5.5 | | | | |
|---|---|---|---|---|
| No. | Radius of curvature r | Center thickness and space d | Refractive index n | Abbe number ν |

-continued f = 71.500–205.000 (focal length of the entire system)
F-number 4.1–5.5

| | | Radius of curvature r | | Center thickness and space d | | Refractive index n | Abbe number ν | | |
|---|---|---|---|---|---|---|---|---|---|
| 1 | $r_{11}$ | 120.465 | $d_1$ | 3.700 | $n_{11}$ | 1.51680 | 64.1 | $L_{11}$ | ⎤ |
| 2 | $r_{12}$ | 1885.001 | $d_2$ | 0.100 | | | | | |
| 3 | $r_{13}$ | 87.589 | $d_3$ | 2.000 | $n_{12}$ | 1.80458 | 25.5 | $L_{12}$ | $G_1$ |
| 4 | $r_{14}$ | 52.453 | $d_4$ | 7.600 | $n_{13}$ | 1.51680 | 64.1 | $L_{13}$ | |
| 5 | $r_{15}$ | −413.504 | $d_5$ | (variable) | | | | | ⎦ |
| 6 | $r_{21}$ | −150.683 | $d_6$ | 1.200 | $n_{21}$ | 1.65160 | 58.5 | $L_{21}$ | ⎤ |
| 7 | $r_{22}$ | 20.543 | $d_7$ | 3.400 | $n_{22}$ | 1.86074 | 23.0 | $L_{22}$ | |
| 8 | $r_{23}$ | 36.361 | $d_8$ | 4.200 | | | | | $G_2$ |
| 9 | $r_{24}$ | −35.217 | $d_9$ | 1.200 | $n_{23}$ | 1.65160 | 58.5 | $L_{23}$ | |
| 10 | $r_{25}$ | 5931.968 | $d_{10}$ | (variable) | | | | | ⎦ |
| 11 | $r_{31}$ | 106.024 | $d_{11}$ | 4.500 | $n_{31}$ | 1.50137 | 56.5 | $L_{31}$ | ⎤ |
| 12 | $r_{32}$ | −37.807 | $d_{12}$ | 0.200 | | | | | |
| 13 | $r_{33}$ | 65.312 | $d_{13}$ | 5.300 | $n_{32}$ | 1.51860 | 70.1 | $L_{32}$ | |
| 14 | $r_{34}$ | −31.533 | $d_{14}$ | 1.400 | $n_{33}$ | 1.75520 | 27.6 | $L_{33}$ | |
| 15 | $r_{35}$ | −393.056 | $d_{15}$ | 0.800 | | | | | |
| 16 | $r_{36}$ | 29.359 | $d_{16}$ | 3.600 | $n_{34}$ | 1.69350 | 53.8 | $L_{34}$ | $G_3$ |
| 17 | $r_{37}$ | 46.171 | $d_{17}$ | 40.200 | | | | | |
| 18 | $r_{38}$ | −18.228 | $d_{18}$ | 2.100 | $n_{35}$ | 1.77279 | 49.4 | $L_{35}$ | |
| 19 | $r_{39}$ | −29.161 | $d_{19}$ | 0.200 | | | | | |
| 20 | $r_{40}$ | 1024.571 | $d_{20}$ | 2.800 | $n_{36}$ | 1.69895 | 30.1 | $L_{36}$ | ⎦ |
| 21 | $r_{41}$ | −73.471 | | | | | | | |

| f | 71.500 | 115.000 | 205.000 |
|---|---|---|---|
| d 5 | 1.400 | 24.501 | 36.417 |
| d 10 | 16.800 | 10.418 | 0.946 |
| B f | 41.267 | 46.675 | 69.107 |

6. A telephoto zoom lens according to claim 1, characterized by the following data:

f = 71.500–205.000 (focal length of the entire system)
F-number 4.1–5.5

| No. | | Radius of curvature r | | Center thickness and space d | | Refractive index n | Abbe number ν | | |
|---|---|---|---|---|---|---|---|---|---|
| 1 | $r_{11}$ | 124.745 | $d_1$ | 3.700 | $n_{11}$ | 1.51680 | 64.1 | $L_{11}$ | ⎤ |
| 2 | $r_{12}$ | 4325.365 | $d_2$ | 0.100 | | | | | |
| 3 | $r_{13}$ | 87.610 | $d_3$ | 2.000 | $n_{12}$ | 1.80458 | 25.5 | $L_{12}$ | $G_1$ |
| 4 | $r_{14}$ | 52.453 | $d_4$ | 7.700 | $n_{13}$ | 1.51680 | 64.1 | $L_{13}$ | |
| 5 | $r_{15}$ | −416.542 | $d_5$ | (variable) | | | | | ⎦ |
| 6 | $r_{21}$ | −150.751 | $d_6$ | 1.200 | $n_{21}$ | 1.65160 | 58.5 | $L_{21}$ | ⎤ |
| 7 | $r_{22}$ | 20.543 | $d_7$ | 3.400 | $n_{22}$ | 1.86074 | 23.0 | $L_{22}$ | |
| 8 | $r_{23}$ | 36.370 | $d_8$ | 4.200 | | | | | $G_2$ |
| 9 | $r_{24}$ | −35.484 | $d_9$ | 1.200 | $n_{23}$ | 1.65160 | 58.5 | $L_{23}$ | |
| 10 | $r_{25}$ | 2543.972 | $d_{10}$ | (variable) | | | | | ⎦ |
| 11 | $r_{31}$ | 103.308 | $d_{11}$ | 4.500 | $n_{31}$ | 1.50137 | 56.5 | $L_{31}$ | ⎤ |
| 12 | $r_{32}$ | −38.149 | $d_{12}$ | 0.200 | | | | | |
| 13 | $r_{33}$ | 64.331 | $d_{13}$ | 5.300 | $n_{32}$ | 1.51860 | 70.1 | $L_{32}$ | |
| 14 | $r_{34}$ | −31.533 | $d_{14}$ | 1.400 | $n_{33}$ | 1.75520 | 27.6 | $L_{33}$ | |
| 15 | $r_{35}$ | −368.870 | $d_{15}$ | 0.800 | | | | | |
| 16 | $r_{36}$ | 29.048 | $d_{16}$ | 3.600 | $n_{34}$ | 1.69350 | 53.8 | $L_{34}$ | $G_3$ |
| 17 | $r_{37}$ | 44.423 | $d_{17}$ | 40.200 | | | | | |
| 18 | $r_{38}$ | −18.138 | $d_{18}$ | 2.100 | $n_{35}$ | 1.76684 | 46.8 | $L_{35}$ | |
| 19 | $r_{39}$ | −28.876 | $d_{19}$ | 0.200 | | | | | |
| 20 | $r_{40}$ | −4032.012 | $d_{20}$ | 2.800 | $n_{36}$ | 1.72825 | 28.3 | $L_{36}$ | ⎦ |
| 21 | $r_{41}$ | −71.662 | | | | | | | |

| f | 71.500 | 135.000 | 205.006 |
|---|---|---|---|
| d 5 | 1.741 | 28.503 | 36.546 |
| d 10 | 16.985 | 7.923 | 1.065 |
| B f | 40.922 | 51.636 | 68.755 |

7. A telephoto zoom lens according to claim 1, characterized by the following data:

f = 71.500–205.000 (focal length of the entire system)
F-number 4.1–5.5

| No. | | Radius of curvature r | | Center thickness and space d | | Refractive index n | Abbe number ν | | |
|---|---|---|---|---|---|---|---|---|---|
| 1 | $r_{11}$ | 153.844 | $d_1$ | 2.300 | $n_{11}$ | 1.80458 | 25.5 | $L_{11}$ | ⎤ |
| 2 | $r_{12}$ | 71.737 | $d_2$ | 5.800 | $n_{12}$ | 1.51680 | 64.1 | $L_{12}$ | $G_1$ |
| 3 | $r_{13}$ | −449.461 | $d_3$ | 0.100 | | | | | |

-continued f = 71.500–205.000 (focal length of the entire system)
F-number 4.1–5.5

| | | | | | | | |
|---|---|---|---|---|---|---|---|
| 4 | $r_{14}$ | 107.481 | $d_4$ | 4.600 | $n_{13}$ 1.51680 | 64.1 | $L_{13}$ |
| 5 | $r_{15}$ | −278.364 | $d_5$ | (variable) | | | |
| 6 | $r_{21}$ | −207.164 | $d_6$ | 1.200 | $n_{21}$ 1.69350 | 53.8 | $L_{21}$ |
| 7 | $r_{22}$ | 20.395 | $d_7$ | 4.000 | $n_{22}$ 1.86074 | 23.0 | $L_{22}$ |
| 8 | $r_{23}$ | 40.805 | $d_8$ | 4.000 | | | |
| 9 | $r_{24}$ | −32.559 | $d_9$ | 1.200 | $n_{23}$ 1.69350 | 53.8 | $L_{23}$ |
| 10 | $r_{25}$ | −687.887 | $d_{10}$ | (variable) | | | |
| 11 | $r_{31}$ | 104.039 | $d_{11}$ | 4.200 | $n_{31}$ 1.49782 | 82.6 | $L_{31}$ |
| 12 | $r_{32}$ | −38.434 | $d_{12}$ | 0.200 | | | |
| 13 | $r_{33}$ | 52.401 | $d_{13}$ | 5.500 | $n_{32}$ 1.48749 | 70.2 | $L_{32}$ |
| 14 | $r_{34}$ | −31.880 | $d_{14}$ | 1.400 | $n_{33}$ 1.74000 | 28.3 | $L_{33}$ |
| 15 | $r_{35}$ | −126.223 | $d_{15}$ | 0.800 | | | |
| 16 | $r_{36}$ | 32.945 | $d_{16}$ | 4.600 | $n_{34}$ 1.62041 | 60.3 | $L_{34}$ |
| 17 | $r_{37}$ | 182.768 | $d_{17}$ | 13.100 | | | |
| 18 | $r_{38}$ | −181.312 | $d_{18}$ | 1.600 | $n_{35}$ 1.76684 | 46.8 | $L_{35}$ |
| 19 | $r_{39}$ | 24.638 | $d_{19}$ | 9.800 | | | |
| 20 | $r_{40}$ | 113.747 | $d_{20}$ | 3.200 | $n_{36}$ 1.62588 | 35.6 | $L_{36}$ |
| 21 | $r_{41}$ | −66.352 | | | | | |

| f | 71.500 | 115.000 | 205.000 |
|---|---|---|---|
| d 5 | 1.825 | 24.320 | 38.650 |
| d 10 | 15.816 | 9.559 | 0.452 |
| B f | 55.650 | 63.190 | 83.289 |

8. A telephoto zoom lens according to claim 1, characterized by the following data:

f = 71.500–205.000 (focal length of the entire system)
F-number 4.1–5.5

| No. | Radius of curvature r | | Center thickness and space d | Refractive index n | Abbe number $\nu$ | | |
|---|---|---|---|---|---|---|---|
| 1 | $r_{11}$ | 118.310 | $d_1$ | 2.300 | $n_{11}$ 1.80458 | 25.5 | $L_{11}$ |
| 2 | $r_{12}$ | 63.790 | $d_2$ | 6.000 | $n_{12}$ 1.51680 | 64.1 | $L_{12}$ |
| 3 | $r_{13}$ | 1325.679 | $d_3$ | 0.100 | | | |
| 4 | $r_{14}$ | 95.278 | $d_4$ | 5.400 | $n_{13}$ 1.51680 | 64.1 | $L_{13}$ |
| 5 | $r_{15}$ | −289.179 | $d_5$ | (variable) | | | |
| 6 | $r_{21}$ | −155.511 | $d_6$ | 1.200 | $n_{21}$ 1.65160 | 58.5 | $L_{21}$ |
| 7 | $r_{22}$ | 20.550 | $d_7$ | 3.400 | $n_{22}$ 1.86074 | 23.0 | $L_{22}$ |
| 8 | $r_{23}$ | 36.637 | $d_8$ | 4.200 | | | |
| 9 | $r_{24}$ | −34.912 | $d_9$ | 1.200 | $n_{23}$ 1.65160 | 58.5 | $L_{23}$ |
| 10 | $r_{25}$ | 2426.367 | $d_{10}$ | (variable) | | | |
| 11 | $r_{31}$ | 115.890 | $d_{11}$ | 3.500 | $n_{31}$ 1.51860 | 70.1 | $L_{31}$ |
| 12 | $r_{32}$ | −84.561 | $d_{12}$ | 0.200 | | | |
| 13 | $r_{33}$ | 50.935 | $d_{13}$ | 4.300 | $n_{32}$ 1.48749 | 70.2 | $L_{32}$ |
| 14 | $r_{34}$ | −88.680 | $d_{14}$ | 0.800 | | | |
| 15 | $r_{35}$ | 38.863 | $d_{15}$ | 5.200 | $n_{33}$ 1.51680 | 64.1 | $L_{33}$ |
| 16 | $r_{36}$ | −54.825 | $d_{16}$ | 1.400 | $n_{34}$ 1.78470 | 26.1 | $L_{34}$ |
| 17 | $r_{37}$ | 145.469 | $d_{17}$ | 39.800 | | | |
| 18 | $r_{38}$ | −19.312 | $d_{18}$ | 2.100 | $n_{35}$ 1.77279 | 49.4 | $L_{35}$ |
| 19 | $r_{39}$ | −32.084 | $d_{19}$ | 0.200 | | | |
| 20 | $r_{40}$ | −701.705 | $d_{20}$ | 2.800 | $n_{36}$ 1.74077 | 27.6 | $L_{36}$ |
| 21 | $r_{41}$ | −64.629 | | | | | |

| f | 71.500 | 115.000 | 205.000 |
|---|---|---|---|
| d 5 | 1.586 | 25.921 | 37.783 |
| d 10 | 17.300 | 11.136 | 1.853 |
| B f | 42.725 | 47.511 | 70.890 |

9. A telephoto zoom lens comprising, in succession from the object side, a first lens group having a positive refractive power, a second lens group having a negative refractive power and a third lens group having a positive refractive power, said second lens group comprising, in succession from the object side, a negative lens having its surface of sharper curvature facing the image side, a positive meniscus lens joined to said negative lens and having its convex surface facing the object side, and a negative lens having its surface of sharper curvature facing the object side, said lens groups being moved during zooming and satisfying the following conditions:

$$1.84 < n_{22} < 1.91$$

$$-0.82 < r_{22}/f_2 < -0.72$$

$$0.8 < \frac{r_{25} + r_{24}}{r_{25} - r_{24}} < 1.3$$

where
$n_{22}$: the refractive index of the second lens in the second lens group
$f_2$: the focal length of the second lens group
$r_{22}$: the radius of curvature of the joined surface of the first lens and the second lens in the second lens group $f_{24}$: the radius of curvature of that surface of the third lens in the second lens group which is adjacent to the object side $r_{25}$: the radius of curvature of that surface of the third lens in the second lens group which is adjacent to the image side.

10. A telephoto zoom lens according to claim 9, satisfying the following conditions:

$$1.3 < f_1/f_W < 1.6$$

$$0.25 < |f_2/f_W| < 0.45$$

$$0.44 < f_3/f_W < 0.52$$

where $f_W$: the focal length of the entire system at the wide end $f_1$: the focal length of the first lens group $f_3$: the focal length of the third lens group.

11. A telephoto zoom lens according to claim 9, wherein said third lens group comprises a forward group having a positive refractive power and a rearward group having a negative refractive power, and satisfies the following conditions:

$$0.6 < f_{3F}/f_3 < 1.3$$

$$1.5 < |f_{3R}/f_3| < 8.5$$

where $f_{3F}$: the focal length of the forward group in the third lens group $f_{3R}$: the focal length of the rearward group in the third lens group.

12. A telephoto zoom lens according to claim 9, characterized by the following data:

| No. | Radius of curvature r | | Center thickness and space d | | Refractive index n | | Abbe number ν | | |
|---|---|---|---|---|---|---|---|---|---|
| 1 | $r_{11}$ | 98.438 | $d_1$ | 3.500 | $n_{11}$ | 1.46450 | 65.8 | $L_{11}$ | ⎤ |
| 2 | $r_{12}$ | 802.616 | $d_2$ | 0.100 | | | | | |
| 3 | $r_{13}$ | 76.116 | $d_3$ | 2.000 | $n_{12}$ | 1.80458 | 25.5 | $L_{12}$ | $G_1$ |
| 4 | $r_{14}$ | 44.695 | $d_4$ | 7.300 | $n_{13}$ | 1.51835 | 60.3 | $L_{13}$ | ⎦ |
| 5 | $r_{15}$ | −279.389 | $d_5$ | (variable) | | | | | |
| 6 | $r_{21}$ | −128.684 | $d_6$ | 1.200 | $n_{21}$ | 1.65160 | 58.5 | $L_{21}$ | ⎤ |
| 7 | $r_{22}$ | 20.994 | $d_7$ | 3.200 | $n_{22}$ | 1.86074 | 23.0 | $L_{22}$ | |
| 8 | $r_{23}$ | 37.184 | $d_8$ | 4.100 | | | | | $G_2$ |
| 9 | $r_{24}$ | −37.845 | $d_9$ | 1.200 | $n_{23}$ | 1.65160 | 58.5 | $L_{23}$ | ⎦ |
| 10 | $r_{25}$ | 6107.025 | $d_{10}$ | (variable) | | | | | |
| 11 | $r_{31}$ | 119.160 | $d_{11}$ | 4.300 | $n_{31}$ | 1.50137 | 56.5 | $L_{31}$ | ⎤ |
| 12 | $r_{32}$ | −37.088 | $d_{12}$ | 0.200 | | | | | |
| 13 | $r_{33}$ | 71.445 | $d_{13}$ | 5.300 | $n_{32}$ | 1.51860 | 70.1 | $L_{32}$ | |
| 14 | $r_{34}$ | −29.228 | $d_{14}$ | 1.400 | $n_{33}$ | 1.75520 | 27.6 | $L_{33}$ | |
| 15 | $r_{35}$ | −333.136 | $d_{15}$ | 0.800 | | | | | |
| 16 | $r_{36}$ | 22.903 | $d_{16}$ | 3.600 | $n_{34}$ | 1.54814 | 45.9 | $L_{34}$ | $G_3$ |
| 17 | $r_{37}$ | 38.213 | $d_{17}$ | 34.800 | | | | | |
| 18 | $r_{38}$ | −15.897 | $d_{18}$ | 2.100 | $n_{35}$ | 1.77279 | 49.4 | $L_{35}$ | |
| 19 | $r_{39}$ | −24.699 | $d_{19}$ | 0.200 | | | | | |
| 20 | $r_{40}$ | −306.837 | $d_{20}$ | 2.800 | $n_{36}$ | 1.86074 | 23.0 | $L_{36}$ | ⎦ |
| 21 | $r_{41}$ | −82.419 | | | | | | | | f = 71.500–204.999 (focal length of the entire system)
F-number 4.1–5.5

| f | 71.500 | 135.000 | 204.999 |
|---|---|---|---|
| d 5 | 2.250 | 22.806 | 29.375 |
| d 10 | 19.898 | 8.849 | 0.957 |
| B f | 41.337 | 53.103 | 69.563 |

13. A telephoto zoom lens according to claim 9, characterized by the following data:

f = 72.318–205.565 (focal length of the entire system)
F-number 4.5–5.0

| No. | Radius of curvature r | | Center thickness and space d | | Refractive index n | | Abbe number ν | | |
|---|---|---|---|---|---|---|---|---|---|
| 1 | $r_{11}$ | 107.200 | $d_1$ | 3.850 | $n_{11}$ | 1.51680 | 64.1 | $L_{11}$ | ⎤ |
| 2 | $r_{12}$ | −1450.001 | $d_2$ | 0.200 | | | | | |
| 3 | $r_{13}$ | 79.420 | $d_3$ | 1.950 | $n_{12}$ | 1.80518 | 25.4 | $L_{12}$ | $G_1$ |
| 4 | $r_{14}$ | 47.810 | $d_4$ | 6.300 | $n_{13}$ | 1.51680 | 64.1 | $L_{13}$ | ⎦ |
| 5 | $r_{15}$ | −1449.991 | $d_5$ | (variable) | | | | | |
| 6 | $r_{21}$ | −203.083 | $d_6$ | 1.000 | $n_{21}$ | 1.69680 | 55.6 | $L_{21}$ | ⎤ |
| 7 | $r_{22}$ | 20.547 | $d_7$ | 3.860 | $n_{22}$ | 1.86074 | 23.0 | $L_{22}$ | |
| 8 | $r_{23}$ | 37.163 | $d_8$ | 3.200 | | | | | $G_2$ |
| 9 | $r_{24}$ | −38.171 | $d_9$ | 1.000 | $n_{23}$ | 1.69680 | 55.6 | $L_{23}$ | ⎦ |
| 10 | $r_{25}$ | −497.113 | $d_{10}$ | (variable) | | | | | |
| 11 | $r_{31}$ | 85.720 | $d_{11}$ | 4.550 | $n_{31}$ | 1.61272 | 58.6 | $L_{31}$ | ⎤ |
| 12 | $r_{32}$ | −31.160 | $d_{12}$ | 1.000 | $n_{32}$ | 1.71736 | 29.5 | $L_{32}$ | |
| 13 | $r_{33}$ | −54.350 | $d_{13}$ | 0.200 | | | | | |
| 14 | $r_{34}$ | 27.615 | $d_{14}$ | 5.160 | $n_{33}$ | 1.48749 | 70.2 | $L_{33}$ | |
| 15 | $r_{35}$ | −88.000 | $d_{15}$ | 2.940 | | | | | |
| 16 | $r_{36}$ | −55.000 | $d_{16}$ | 2.000 | $n_{34}$ | 1.75520 | 27.6 | $L_{34}$ | $G_3$ |

-continued

| | | f = 72.318–205.565 (focal length of the entire system) F-number 4.5–5.0 | | | | | | |
|---|---|---|---|---|---|---|---|---|
| 17 | $r_{37}$ | 0.000 | $d_{17}$ | 36.100 | | | | |
| 18 | $r_{38}$ | −17.300 | $d_{18}$ | 1.270 | $n_{35}$ | 1.69680 | 55.6 | $L_{35}$ |
| 19 | $r_{39}$ | −30.500 | $d_{19}$ | 0.200 | | | | |
| 20 | $r_{40}$ | 700.000 | $d_{20}$ | 2.480 | $n_{36}$ | 1.71736 | 29.5 | $L_{36}$ |
| 21 | $r_{41}$ | −68.001 | | | | | | |

| f | 72.818 | 133.831 | 205.565 |
|---|---|---|---|
| d 5 | .939 | 25.106 | 32.939 |
| d 10 | 20.091 | 10.046 | 1.650 |
| B f | 42.052 | 49.813 | 64.511 |

* * * * *